United States Patent
Hsieh et al.

(10) Patent No.: US 10,745,550 B2
(45) Date of Patent: Aug. 18, 2020

(54) EPOXY RESIN COMPOSITION

(71) Applicant: INDUSTRIAL TECHNOLOGY RESEARCH INSTITUTE, Hsinchu (TW)

(72) Inventors: Feng-Ming Hsieh, Tainan (TW); Mei-Hua Wang, Jhunan Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 13 days.

(21) Appl. No.: 16/172,080

(22) Filed: Oct. 26, 2018

(65) Prior Publication Data

US 2019/0127572 A1  May 2, 2019

Related U.S. Application Data

(60) Provisional application No. 62/577,895, filed on Oct. 27, 2017.

(30) Foreign Application Priority Data

Aug. 23, 2018 (TW) .............................. 107129476 A

(51) Int. Cl.
| | |
|---|---|
| C08L 63/00 | (2006.01) |
| C08L 63/02 | (2006.01) |
| C08L 63/04 | (2006.01) |
| C08L 15/00 | (2006.01) |
| C08G 59/20 | (2006.01) |
| C08G 59/40 | (2006.01) |
| C08G 59/42 | (2006.01) |
| C08G 59/44 | (2006.01) |
| C08G 59/50 | (2006.01) |

(52) U.S. Cl.
CPC ................... C08L 63/00 (2013.01)

(58) Field of Classification Search
None
See application file for complete search history.

(56) References Cited

U.S. PATENT DOCUMENTS

| | | | |
|---|---|---|---|
| 4,990,587 A | 2/1991 | Shaw et al. | |
| 5,312,950 A | 5/1994 | Bertsch | |
| 7,291,680 B1 | 11/2007 | Shih et al. | |
| 7,465,492 B2 | 12/2008 | Gilbert | |
| 7,670,649 B2 | 3/2010 | Hoyles et al. | |
| 7,820,760 B2 | 10/2010 | Pham et al. | |
| 7,847,026 B2 | 12/2010 | Bertsch et al. | |
| 7,923,073 B2 | 4/2011 | Verghese et al. | |
| 8,829,101 B2 | 9/2014 | Jacob et al. | |
| 9,346,908 B1 | 5/2016 | Hsieh et al. | |
| 9,834,671 B2 | 12/2017 | Feng et al. | |
| 2008/0283415 A1 | 11/2008 | Gilbert | |
| 2011/0021852 A1 | 1/2011 | Shih et al. | |
| 2014/0005318 A1* | 1/2014 | Takeda | C08G 73/1039 524/360 |

FOREIGN PATENT DOCUMENTS

| | | | |
|---|---|---|---|
| CN | 86108464 A | 6/1988 | |
| CN | 1154980 A | 7/1997 | |
| CN | 102019206 A | 4/2011 | |
| EP | 2643380 B1 | 10/2015 | |
| JP | 2001233931 A * | 8/2001 | ............. C08G 59/20 |
| TW | I320333 B | 2/2010 | |
| TW | 201016781 A1 | 5/2010 | |
| TW | 201103628 A1 | 2/2011 | |
| TW | I480372 B | 4/2015 | |
| TW | I566835 B | 1/2017 | |
| TW | I572631 B | 3/2017 | |
| TW | I573850 B | 3/2017 | |
| WO | 2017053526 A1 | 3/2017 | |

OTHER PUBLICATIONS

Machine translation of JP-2001233931-A (no. date).*
Barcia et al. "Synthesis and properties of epoxy resin modified with epoxy-terminated liquid polybutadiene", Elsevier, Polymer 44, (2003), p. 5811-5819.
Heng et al. "Simultaneously enhanced tensile strength and fracture toughness of epoxy resins by a poly(ethylene oxide)-block-carboxyl terminated butadiene-acrylonitrile rubber dilock copolymer", RSC Advances, 2015, 5, 42362-42368.
Saleh et al. "Compatibility, Mechanical, Thermal, and Morphological Properties of Epoxy Resin Modified with Carbonyl-Terminated Butadiene Acrylonitrile Copolymer Liquid Rubber", Journal of Physical Science, vol. 20(1), 2009, p. 1-12.
Thomas et al. "Influence of Carboxyl-Terminated (Butadiene-co-acrylonitrile) Loading on the Mechanical and Thermal Properties of Cured Epoxy Blends", Journal of Polymer Science: Part B: Polymer Physics, vol. 42, 2531-2544, (2004).
Taiwanese Office Action for Appl. No. 107129476 dated Sep. 4, 2019.
Taiwanese Office Action for Appl. No. 107129476 dated Mar. 20, 2020.

* cited by examiner

Primary Examiner — Michael J Feely
(74) Attorney, Agent, or Firm — Birch, Stewart, Kolasch & Birch, LLP

(57) ABSTRACT

An epoxy resin composition is provided. The epoxy resin composition includes 80-100 parts by weight of a thermal curable epoxy resin, and 0.1-20 parts by weight of a branched rubber copolymer. The branched rubber copolymer includes a rubber polymer serving as a main portion, and a polymer composed of polyethylene glycol (PEG), derivatives of polyethylene glycol, polycaprolactone (PCL), derivatives of polycaprolactone, or a combination thereof serving as a branched chain.

14 Claims, 1 Drawing Sheet

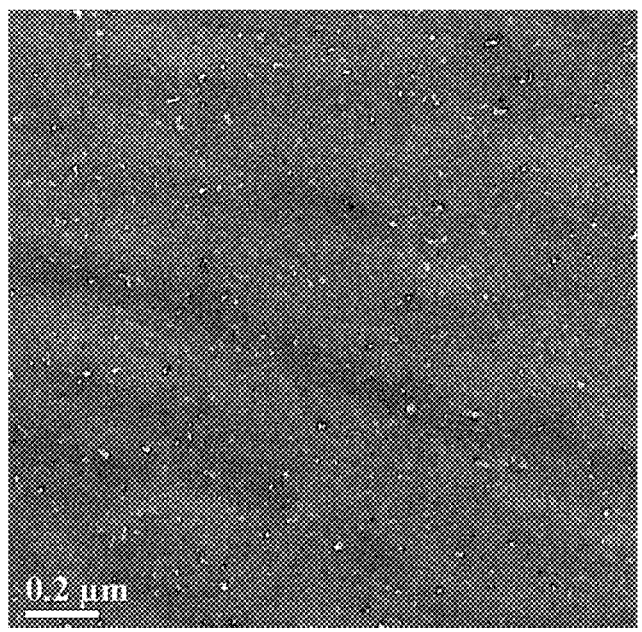

EPOXY RESIN COMPOSITION

CROSS REFERENCE TO RELATED APPLICATIONS

This application claims the benefit of U.S. Provisional Application No. 62/577,895, filed on Oct. 27, 2017, and claims priority of Taiwan Application No. 107129476, filed on Aug. 23, 2018, the entirety of which are incorporated by reference herein.

TECHNICAL FIELD

The technical field relates to an epoxy resin composition. More specifically, it relates to an epoxy resin composition containing a toughener.

BACKGROUND

Epoxy resins possess characteristics such as fine adhesion, corrosion resistance, water resistance, chemical resistance, mechanical strength, dielectric properties, heat resistance, processability, and low contraction rates. Also, their manufacturing cost is low, and thus epoxy resins have been used in various fields. However, the greatest disadvantage of these general-purpose epoxy resins is that they become a high-density, crosslinked polymer after curing, which has high internal stress and results in high brittleness and poor impact resistance. Therefore, the need to improve toughness emerged.

It is known that a liquid rubber can be used as a toughener for an epoxy resin, and liquid carboxyl-terminated polybutadiene-acrylonitrile (CTBN) is the best-known liquid rubber. By introducing a liquid rubber, an epoxy resin may form a rubber microparticle structure of microphase separation after curing. The structure has the effect of absorbing or reducing internal stress, and further improving the toughness, impact resistance, ductility, thermal shock resistance, peel strength, and low-temperature shear performance of the epoxy resin. As a result, the epoxy resin can be used in a wide range of applications. Examples of these applications include being used in adhesives (e.g. adhesives for plastics, metals, or ceramic materials), anti-seismic materials, oil resistant hoses, composite materials (e.g. blades for a wind-power generation, the fuselage of an airplane or yacht, and glass fiber tubes), coatings (e.g. paint for building material, strengthening fluids, insulation coatings, water-proof coatings, and corrosion-resistant coatings), sealants and pouring sealants for electronics, and even in aerospace and military applications.

Although the use of liquid rubber may form a microphase separated structure in an epoxy resin to improve the toughness of the epoxy resin, it usually raises some problems, however. Potential problems are as follows: (1) the decrease of heat resistance resulting from the drastic decrease of glass transition temperature; (2) the significant decrease of elastic modulus and stiffness; (3) losing transparency; and (4) needing a large amount of toughener (generally 10%-20%) to obtain the desired toughness.

Conventionally, different liquid rubbers have been used as tougheners in epoxy resins. For example, a non-reactive liquid carboxyl-terminated polybutadiene-acrylonitrile has been added to epoxy resin to improve toughness, but the non-reactive liquid carboxyl-terminated polybutadiene-acrylonitrile is liable to form incomplete microphase separation and incomplete crosslinking in an epoxy resin, which may lead to insufficient improvement in toughness and poor stability. Moreover, after adding the non-reactive liquid carboxyl-terminated polybutadiene-acrylonitrile, the heat resistance, stiffness, and transparency of the epoxy resin significantly decrease as well.

Liquid carboxyl-terminated polybutadiene-acrylonitrile (CTBN) and liquid carboxyl-terminated polybutadiene (CTPB) have also been used as tougheners in epoxy resins, but the effect of inhibiting the decrease of heat resistance is still not enough. The stiffness and transparency of the epoxy resin cannot be maintained either.

Although liquid hydroxyl-terminated liquid nitrile rubber (HTBN) may exhibit similar properties as liquid carboxyl-terminated polybutadiene-acrylonitrile (CTBN) with a lower cost, HTBN still has some problems, such as needing a large additive amount, and the inevitable decrease in heat resistance, stiffness, and transparency, and so on.

Liquid epoxy terminated polybutadiene-acrylonitrile (ETBN) and liquid epoxy terminated polybutadiene (ETPB), which do not need a pretreatment of prepolymerization, can raise the toughness of the epoxy resin effectively; however, they still cannot solve the problems of decreased heat resistance, stiffness, and transparency. Also, they are not cost-effective.

Adding a small amount of PEG-b-CTBN diblock copolymer and PEG-b-CTBN-b-PEG triblock copolymer may raise the toughness of the epoxy resin effectively. However, diblock copolymer cannot preserve the heat resistance of the epoxy resin, and the glass transition temperature decreases significantly as the added amount increases.

Therefore, with the increasing need for the better performance of epoxy resins manufactures, it has become important to improve the toughness of epoxy resins without negatively affecting other characteristics (such as heat resistance, stiffness, and transparency).

SUMMARY

According to one embodiment of the present disclosure, it provides an epoxy resin composition, including 80-100 parts by weight of a thermal curable epoxy resin, and 0.1-20 parts by weight of a branched rubber copolymer. The branched rubber copolymer includes a rubber polymer serving as a main portion, and a polymer composed of polyethylene glycol (PEG), derivatives of polyethylene glycol, polycaprolactone (PCL), derivatives of polycaprolactone, or a combination thereof serving as a branched chain.

To further simplify and clarify the foregoing contents and other objects, characteristics, and merits of the present disclosure, a detailed description is given in the following embodiments with reference to the accompanying drawings.

BRIEF DESCRIPTION OF THE DRAWINGS

FIG. 1 is a transmission electron microscope (TEM) image of a slice of the epoxy resin composition in Example 1.

DETAILED DESCRIPTION

Unless explicitly indicated by the description, as used herein, the singular forms "a," "an" and "the" are intended to include the plural forms as well, unless the context clearly indicates otherwise. It will be further understood that when such as the term "comprises" and/or "comprising," is used in this specification, it specifies the presence of described features, steps, operations, elements, and/or components, but does not preclude the presence or addition of one or more other features, steps, operations, elements, components, and/or groups thereof.

Throughout this specification, the term "one embodiment" or "an embodiment" means that a particular feature, structure, or characteristic described in connection with the embodiment is included in at least one embodiment. Thus, the phrases "in one embodiment" or "in an embodiment" in various contexts throughout this specification do not necessarily all refer to the same embodiment. Furthermore, the particular features, structures, or characteristics may be combined in any suitable manner in one or more embodiments. It should be appreciated that the following FIGURES are not drawn to scale; rather, these FIGURES are merely illustration.

One embodiment in this disclosure provides a branched rubber copolymer to serve as a toughener of an epoxy resin. This toughener may improve the toughness while reducing the impact on heat resistance, stiffness, tensile strength, transparency of the epoxy resin.

One embodiment of the disclosure provides an epoxy resin composition, which includes 80-100 parts by weight of a thermal curable epoxy resin, and 0.1-20 parts by weight of a branched rubber copolymer. For instance, in some embodiments, the epoxy resin composition may include 85-95 parts by weight of a thermal curable epoxy resin and 5-15 parts by weight of a branched rubber copolymer. If the content of the branched rubber copolymer is too low, the toughness cannot be raised efficiently. If the content of the branched rubber copolymer is too high, the effect of improving toughness is limited and may impair other characteristics.

In some embodiments, the epoxy resin composition may include 100 parts by weight of a thermal curable epoxy resin, and 5-120 parts by weight of a curing agent, and 0-2 parts by weight of an accelerant. For example, in some embodiments, the thermal curable epoxy resin may include 100 parts by weight of an epoxy resin, 90-95 parts by weight of a curing agent, and 0.1-0.5 parts by weight of an accelerant.

In some embodiments, the epoxy resin may include bisphenol A epoxy resin, phenolic epoxy resin, bisphenol F epoxy resin, bisphenol S epoxy resin, alicyclic epoxy resin, halogenated bisphenol A epoxy resin, hydrogenated bisphenol A epoxy resin, polyfunctional groups diglycidyl ether resin, polyfunctional groups diglycidyl ether resin, heterocycle epoxy resin, or a combination thereof. In some embodiments, the curing agent may include methyltetrahydrophthalic anhydride (MTHPA), 4-methylhexahydrophthalic anhydride, succinic anhydride, dicyandiamide, m-phenylenediamine, triethylenetetramine, polyetheramine, diaminodiphenyl sulfone, polyethylenimine, or a combination thereof. In some embodiments, the accelerant may include 1-methyl-imidazole, 2,4,6-tri (dimethylamine methylene) phenol, 3-(3,4-dichlorophenyl)-1,1-dimethylurea, benzyltriethylammonium chloride, or a combination thereof. A person skilled in the art may choose, depending on the desired properties, suitable species and ratio of the epoxy resin, the curing agent and the accelerant to form a thermal curable epoxy resin.

In some embodiments, the branched rubber copolymer may include a rubber polymer serving as a main portion, and a polymer composed of polyethylene glycol (PEG), derivatives of polyethylene glycol, polycaprolactone (PCL), derivatives of polycaprolactone, or a combination thereof serving as a branched chain.

In some embodiments, the branched rubber copolymer possesses a viscosity of 1-500 Pa·s when the temperature is below 100° C., such as 1-200 Pa·s or 10-120 Pa·s. If the viscosity of the rubber polymer is too low, then the rubber polymer may not have the effect of improving toughness; if the viscosity of the rubber polymer is too high, the epoxy resin composition made from the rubber polymer may have poor operability.

In some embodiments, the rubber polymer serving as the main portion may include a homopolymer or copolymer of diene rubber, hydrogenated diene rubber, polyacrylate rubber, ethylene propylene rubber, butyl rubber, silicone rubber, fluororubber, or a combination thereof.

In some embodiments, a monomer of the diene rubber may include a structure as follows:

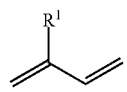

wherein the $R^1$ is H or $CH_3$.

In some embodiments, a monomer of the polyacrylate rubber may include the structure as follows:

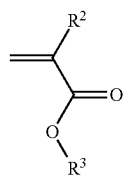

wherein the $R^2$ is H or $CH_3$; $R^3$ is a saturated or unsaturated $C_6$-$C_{18}$ carbon chain.

In some embodiments, the branched rubber copolymer may include 0-15 mol % of a functional group capable of participating in a curing reaction of a thermal curable epoxy resin. The functional group may include a carboxyl group, a hydroxyl group, an epoxy group, an amino group, or a combination thereof. For example, in some embodiments, the branched rubber copolymer may further include 5-12 mol % of the above functional groups. When a branched rubber copolymer includes the above functional groups capable of participating in a curing reaction of a thermal curable epoxy resin, the structural stability of the rubber can be reinforced to improve the toughness even further.

In some embodiments, the functional groups that participate in a curing reaction of a thermal curable epoxy resin are on the rubber polymer serving as the main portion or on the polymer serving as a branched chain.

In some embodiments, the number average molecular weight of the branched rubber copolymer may be 1,000-60,000, such as 3,000-20,000. In some embodiments, the number average molecular weight of the polymer used as a branched chain may be 300-30,000, such as 500-6,000.

In some embodiments, the percentage by weight (wt %) of the polymer used as a branched chain may be 15 wt %-65 wt %, such as 25 wt %-60 wt % or 30 wt %-50 wt %, each wt % being based on the total branched rubber copolymer weight. If the content of the polymer used as a branched chain is too low, the rubber polymer serving as a main portion cannot be effectively dispersed in an epoxy resin composition but it will aggregate into a micro rubber structure, which makes other characteristics hard to preserve, just as a normal toughener of liquid rubbers. If the content of the polymer serving as a branched chain is too high, the content of the polymer serving as the main portion will be too low to efficiently improve toughness.

It should be noted that the position of the branched chains of the branched rubber copolymer is in a random arrangement. The branched chain may be connected to the main portion rubber polymer by a copolymerization reaction or a grafting reaction. The copolymerization reaction may be conducted by polymerizing a macromonomer containing the structures of foregoing branched chain, such as poly(ethylene glycol) acrylate, with a rubber monomer. The grafting reaction may be conducted by connecting a branched chain polymer (such as methoxypolyethylene glycol) to a grafting reaction site of the main portion rubber polymer (such as a carboxyl structure obtained from a copolymerization of a rubber monomer and acrylic acid), or may be conducted by using the grafting reaction site as an initial point to grow a branched chain by polymerizing monomer of a branched chain (such as ethylene oxide or caprolactone). Therefore, after polyethylene glycol (PEG), derivatives of polyethylene glycol, polycaprolactone (PCL), derivatives of polycaprolactone, or a combination thereof used as a branched chain copolymerizing with a rubber, according to the rule of the reaction mechanism, the positions that the branched chains connected to are random. The positions will not be limited to terminals of the rubber polymer. Instead, it will form a branched rubber copolymer as described in some embodiments. Comparing to diblock or triblock copolymers which connect each other at the terminals, the branched rubber copolymer in some embodiments of present disclosure can enforce the anchoring force at interface through entanglement between branched chains and an epoxy resin, thus raising the stability of the rubber structure and further improving toughness.

In some embodiments, the polyethylene glycol may include straight-chain polyethylene glycol, branched-chain polyethylene glycol, functionalized polyethylene glycol, or a combination thereof. For example, in some embodiments, the polyethylene glycol structure may be obtained from straight-chain polyethylene glycol methyl ether methacrylate, polyethylene glycol acrylate, or a combination thereof. In some embodiments, the polycaprolactone may include straight-chain polycaprolactone, branched-chain polycaprolactone, functionalized polycaprolactone, or a combination thereof.

As mentioned above, in some embodiments of the present disclosure provides the structure of the branched rubber copolymer includes a rubber polymer serving as a main portion and a polymer serving as a branched chain. It should be noted that the rubber polymer used as the main portion does not dissolve in an epoxy resin, which is also called epoxy-phobic, but the polymer used as a branched chain can dissolve in an epoxy resin, which is also called epoxy-philic. If the polymer used as a branched chain in the branched rubber copolymer can dissolve in an epoxy resin, the branched rubber copolymer may possess better solubility. Unlike the microphase separated structure formed by conventional liquid rubbers, the characteristics of the branched rubber copolymer that some embodiments provide can let it form a nano-rubber structure in an epoxy resin. Since the nano-rubber structure shows more stable dispersion, the branched rubber copolymer that some embodiments provide can not only improve toughness of an epoxy resin but also preserve the original properties of the epoxy resin, such as heat resistance, stiffness, tensile strength, transparency and so on, thus alleviating the problems facing conventional liquid rubber tougheners.

In the following paragraphs, exemplary embodiments and comparative examples will be described in detail so as to explain the epoxy resin composition of the present disclosure and the characteristics of it.

EXAMPLES

Preparation of the Branched Rubber Copolymer (Toughener)

Preparation Example 1

53.8 g polyethylene glycol methyl ether methacrylate (PEG-MA, Mn=950) was placed in a high-pressure reactor and dissolved in 49.5 g butanol by stirring. After introducing $N_2$ to remove air, 64.5 g isoprene and 4.5 g azobisisobutyronitrile, which was used as an initiator, were added to the reactor. The temperature of the reactor was raised to 80° C. for reaction for 56 hours. Subsequently, product A was obtained after a purification and concentration process.

Using polystyrene as a standard, the number average molecular weight (Mn) of product A was determined to be 7,619 by gel permeation chromatography (GPC). The structure of product A was analyzed by $^1H$ NMR (solvent is $CDCl_3$), the molar ratio of polyisoprene to PEG was 94.4:5.6, which means PEG accounts for 45.3 wt % of product A. The viscosity of product A was 15 Pa·s (Brookfield viscosity@27° C.) as analyzed by cone and plate viscometer.

Preparation Example 2

53.8 g polyethylene glycol methyl ether methacrylate (Mn=950) was placed in a high-pressure reactor and dissolved in 64.5 g butanol by stirring. After introducing $N_2$ to purge air, 64.5 g isoprene and 3.9 g azobisisobutyronitrile, which was used as an initiator, were added. The temperature of the reactor was raised to 80° C. for reaction for 45 hours. Subsequently, product B was obtained after a purification and concentration process.

Using polystyrene as a standard, the number average molecular weight (Mn) of product B was determined to be 6,627 by gel permeation chromatography (GPC). The structure of product B was analyzed by $^1H$ NMR (solvent is $CDCl_3$), the molar ratio of polyisoprene to PEG was 95.6:4.4, which means PEG accounts for 39.1 wt % of product B. The viscosity of product B was 23 Pa·s (Brookfield viscosity@27° C.) as analyzed by cone and plate viscometer.

Preparation Example 3

13 g polyethylene glycol methyl ether methacrylate (Mn=950) was placed in a high-pressure reactor and dissolved in 15.5 g butanol by stirring. After introducing $N_2$ to remove air, 15 g 1,3-butadiene and 1.7 g azobisisobutyronitrile, which was used as an initiator, were added to the reactor. The temperature of the reactor was raised to 70° C. for reaction for 40 hours. Subsequently, product C was obtained after a purification and concentration process.

Using polystyrene as a standard, the number average molecular weight (Mn) of product C was determined to be 7,051 by gel permeation chromatography (GPC). The structure of product C was analyzed by $^1H$ NMR (solvent is $CDCl_3$), the molar ratio of polybutadiene to PEG was 95.3:4.7, which means PEG accounts for 46.5 wt % of product C. The viscosity of product C was 18 Pa·s (Brookfield viscosity@27° C.) as analyzed by cone and plate viscometer.

Preparation Example 4

16.6 g polyethylene glycol methyl ether methacrylate (Mn=950) was placed in a high-pressure reactor and dissolved in 24 g butanol by stirring. After introducing $N_2$ to remove air, 24 g 1,3-butadiene and 2.9 g azobisisobutyronitrile, which was used as an initiator, were added to the reactor. The temperature of the reactor was raised to 80° C. for reaction for 40 hours. Subsequently, product D1 was obtained after a purification and concentration process.

Using polystyrene as a standard, the number average molecular weight (Mn) of product D1 was determined to be 5,504 by gel permeation chromatography (GPC). The structure of product D1 was analyzed by $^1$H NMR (solvent is $CDCl_3$), the molar ratio of polybutadiene to PEG was 96.5:3.5, which means PEG accounts for 38.9 wt % of product D1.

Then, 15 g product D1 and 1.44 g triphenylphosphine were added into a high-pressure reactor and dissolved in 100 g butanone by stirring. After introducing $N_2$ to remove air, 27 mg chloro(1,5-cyclooctadiene)rhodium(I) dimer (CAS 12092-47-6) was added to the reactor. 1,000 psi $H_2$ was introduced in, and the temperature of the reactor was raised to 100° C. for reaction for 16 hours. Subsequently, product D2 was obtained after a purification and concentration process. The degree of hydrogenation of D2 was determined to be 99.5% by $^1$H NMR (solvent is $CDCl_3$). PEG accounts for 37.3 wt % of product D2. Using polystyrene as a standard, the number average molecular weight (Mn) of product D2 was determined to be 6,033 by gel permeation chromatography (GPC). The viscosity of product D2 is 55 Pa·s (Brookfield viscosity@50° C.) as analyzed by cone and plate viscometer.

Preparation Example 5

9.2 g polyethylene glycol methyl ether methacrylate (Mn=2,000) and 0.75 g methacrylic acid were placed in a high-pressure reactor and dissolved in 21.5 g butanol by stirring. After introducing $N_2$ to remove air, 21.5 g isoprene and 1 g azobisisobutyronitrile, which was used as an initiator, were added to the reactor. The temperature of the reactor was raised to 80° C. for reaction for 47 hours. Subsequently, product E was obtained after a purification and concentration process.

Using polystyrene as a standard, the number average molecular weight (Mn) of product E was determined to be 15,872 by gel permeation chromatography (GPC). The structure of product E was analyzed by $^1$H NMR (solvent is $CDCl_3$), the molar ratio of polybutadiene to PEG was 98.6:1.4, which means PEG accounts for 29.4 wt % of product E.

Analyzed by acid-base titration, the acid value of product E was 22 mg KOH/g, which means product E contains carboxyl functional group 6.2 mol %. The viscosity of product E was 68 Pa·s (Brookfield viscosity@75° C.) as analyzed by cone and plate viscometer.

Preparation Example 6

1 g 2-ethylhexyl acrylate, 7.5 g stearyl methacrylate, 0.5 g glycidyl methacrylate and 3.9 g polyethylene glycol methyl ether methacrylate (Mn=2,000) were placed in a high-pressure reactor and dissolved in 12 g toluene by stirring. After introducing $N_2$ to remove air, 0.095 g azobisisobutyronitrile, which was used as an initiator, and 0.7 g dodecanethiol were added to the reactor. The temperature of the reactor was raised to 70° C. and for reaction for 24 hours. Subsequently, product F was obtained after a purification and concentration process.

Using polystyrene as a standard, the number average molecular weight (Mn) of product F was determined to be 7,948 by gel permeation chromatography (GPC). The structure of product F was analyzed by $^1$H NMR (solvent is $CDCl_3$), the molar ratio of poly(methyl) methacrylate to PEG was 93.8:6.2, which means PEG accounts for 31.3 wt % of product F. The viscosity of product F was 112 Pa·s (Brookfield viscosity@75° C.) as analyzed by cone and plate viscometer.

Preparation Example 7

15 g ε-caprolactone was placed in a reaction vessel. After introducing $N_2$ to remove air, the temperature of the reactor was raised to 130° C. and then 1.9 g 2-hydroxyethyl methacrylate and 0.018 g stannous octoate were added in, and thoroughly stirred. After reacting for 16 hours, the temperature was cooled down to obtain HEMA-PCL. The molecular weight of HEMA-PCL was 1,194 as analyzed and calculated by $^1$H NMR (solvent is $CDCl_3$).

9 g stearyl methacrylate and 11 g HEMA-PCL were placed in a high-pressure reactor and dissolved in 9 g butanol by stirring. After introducing $N_2$ to remove air, 0.06 g azobisisobutyronitrile, which is used as an initiator, and 0.23 g dodecanethiol were added to the reactor. The temperature of the reactor was raised to 70° C. for reaction for 24 hours. Subsequently, product G was obtained after a purification and concentration process.

Using polystyrene as a standard, the number average molecular weight (Mn) of product G was determined to be 19,864 by gel permeation chromatography (GPC). The structure of product G was analyzed by $^1$H NMR (solvent is $CDCl_3$), the molar ratio of poly(methyl) methacrylate to polycaprolactone was 74.1:25.9, which means polycaprolactone accounts for 55.2 wt % of product G. The viscosity of product G was 81 Pa·s (Brookfield viscosity@75° C.) as analyzed by cone and plate viscometer.

TABLE 1

| Toughener | Monomer of the main portion rubber polymer | Branched chain polymer | Product | Mn | Main portion rubber polymer/branched chain polymer (mol) | Branched chain polymer (wt %) | viscosity (Pa · s) |
|---|---|---|---|---|---|---|---|
| Preparation Example 1 | isoprene | polyethylene glycol | A | 7619 | 94.4/5.6 | 45.3 | 15 @27° C. |
| Preparation Example 2 | isoprene | polyethylene glycol | B | 6627 | 95.6/4.4 | 39.1 | 23 @27° C. |
| Preparation Example 3 | 1,3-butadiene | polyethylene glycol | C | 7051 | 95.3/4.7 | 46.5 | 18 @27° C. |
| Preparation Example 4 | 1,3-butadiene (hydrogenated) | polyethylene glycol | D2 | 6033 | 96.5/3.5 | 37.3 | 55 @50° C. |

TABLE 1-continued

| Toughener | Monomer of the main portion rubber polymer | Branched chain polymer | Product | Mn | Main portion rubber polymer/branched chain polymer (mol) | Branched chain polymer (wt %) | viscosity (Pa · s) |
|---|---|---|---|---|---|---|---|
| Preparation Example 5 | Isoprene, methacrylic acid | polyethylene glycol | E | 15872 | 98.6/1.4 | 29.4 | 68 @75° C. |
| Preparation Example 6 | 2-ethylhexyl acrylate, stearyl methacrylate, glycidyl methacrylate | polyethylene glycol | F | 7948 | 93.8/6.2 | 31.3 | 112 @75° C. |
| Preparation Example 7 | stearyl methacrylate | Polycaprolactone | G | 19864 | 74.1/25.9 | 55.2 | 81 @75° C. |

Comparative Example 1

100 parts by weight of bisphenol A epoxy resin (Araldite LY556, purchased from Huntsman), 90 parts by weight of methyltetrahydrophthalic anhydride (MTHPA), which is used as a toughener, and 0.5 parts by weight of 1-methyl-imidazole, which is used as an accelerant, were thoroughly mixed by a blender under 50° C., and then subjected to vacuum degassing to obtain an epoxy resin matrix. After that, the epoxy resin matrix filled into a test piece mold, and maintained at 80° C. for 4 hours. Then, after a curing process at a constant temperature of 140° C. for 8 hours, a test piece of the epoxy resin composition was obtained. The dimensions of the test piece were determined in accordance with ASTM test method.

Comparative Example 2-1

95 parts by weight of the epoxy resin matrix in Comparative Example 1 was stirred under 50° C., and 5 parts by weight of CTBN (Hypro 1300×13, purchased from CVC) was added as a toughener. The mixture was stirred for an hour and then vacuum degassed. The mixture was filled in a test piece mold, and maintained at 80° C. for 4 hours. Then, after a curing process at a constant temperature of 140° C. for 8 hours, a test piece of the epoxy resin composition was obtained. The dimensions of the test piece were determined in accordance with ASTM test method.

Comparative Example 2-2

A process that was similar to the one in Comparative Example 2-1 was repeated except that the amount of epoxy resin matrix was decreased to 90 parts by weight, and the amount of toughener, CTBN, was raised to 10 parts by weight.

Comparative Example 2-3

A process that was similar to the one in Comparative Example 2-1 was repeated except that the amount of epoxy resin matrix was decreased to 85 parts by weight, and the amount of toughener, CTBN, was raised to 15 parts by weight.

Epoxy Resin Composition

Example 1

95 parts by weight of the epoxy resin matrix in Comparative Example 1 was stirred under 50° C., and 5 parts by weight of product A in Preparation Example 1 was added in as a toughener. The mixture was further stirred for 20 minutes after the initial stirring and then vacuum degassed. The mixture was filled in a test piece mold, and maintained at 80° C. for 4 hours. Then, after a curing process at a constant temperature of 140° C. for 8 hours, a test piece of the epoxy resin composition was obtained. The dimensions of the test piece were determined in accordance with ASTM test method.

Example 2

A process that was similar to the one in Example 1 was repeated except that the toughener is product B in Preparation Example 2.

Example 3

A process that was similar to the one in Example 1 was repeated except that the toughener is product C in Preparation Example 3.

Example 4

A process that was similar to the one in Example 1 was repeated except that the toughener is product D2 in Preparation Example 4.

Example 5

A process that was similar to the one in Example 1 was repeated except that the toughener is product E in Preparation Example 5.

Example 6

A process that was similar to the one in Example 1 was repeated except that the toughener is product F in Preparation Example 6.

Example 7

A process that was similar to the one in Example 1 was repeated except that the toughener is product G in Preparation Example 7.

Example 8

A process that was similar to the one in Example 2 was repeated except that the epoxy resin matrix is 90 parts by weight, and the toughener, product B, is 10 parts by weight.

Performance Evaluation of Epoxy Resin Compositions

Comparative Example 1, Comparative Example 2-1, Comparative Example 2-2, Comparative Example 2-3, Example 1-8 were evaluated for their performance, including (1) heat resistance (glass transition temperature (Tg), determined in accordance with ASTM D3418), (2) elastic modulus (E, determined in accordance with ASTM D638), (3) tensile strength (determined in accordance with ASTM D638), (4) transparency (determined by a thickness of 5 mm), (5) fracture toughness ($K_{1c}$, determined in accordance with ASTM D5045; single-edge notched bending (SENB)), and (6) fracture toughness ($G_{1c}$, determined in accordance with ASTM D5045). The results are shown in Table 2.

Moreover, a slice of the epoxy resin composition in Example 1 which was dyed by $RuO_4$ was analyzed by TEM, and 10 nm-50 nm rubber structure dispersed in the epoxy resin composition can be observed, while no microphase separation was observed, as shown in FIG. 1.

TABLE 2

| Test pieces | matrix (parts by weight) | toughener (parts by weight) | Tg (° C.) | E (GPa) | tensile strength (MPa) | transparency | K1c (MPa m$^{1/2}$) | G1c (KJ/m$^2$) |
|---|---|---|---|---|---|---|---|---|
| Comparative Example 1 | 100 | — | 131 | 2.8 | 82 | ○ | 0.71 | 0.16 |
| Comparative Example 2-1 | 95 | CTBN (5) | 125 | 2.5 | 75 | X | 1.03 | 0.37 |
| Comparative Example 2-2 | 90 | CTBN (10) | 119 | 2.2 | 61 | X | 1.24 | 0.62 |
| Comparative Example 2-3 | 85 | CTBN (15) | 114 | 2.0 | 55 | X | 1.33 | 0.77 |
| Example 1 | 95 | Product A (5) | 131 | 2.8 | 78 | ○ | 1.52 | 0.72 |
| Example 2 | 95 | Product B (5) | 130 | 2.7 | 79 | ○ | 1.77 | 1.04 |
| Example 3 | 95 | Product C (5) | 132 | 2.7 | 77 | ○ | 1.57 | 0.80 |
| Example 4 | 95 | Product D2 (5) | 133 | 2.7 | 77 | ○ | 1.46 | 0.71 |
| Example 5 | 95 | Product E (5) | 129 | 2.6 | 77 | ○ | 1.86 | 1.14 |
| Example 6 | 95 | Product F (5) | 131 | 2.6 | 78 | ○ | 1.66 | 0.75 |
| Example 7 | 95 | Product G (5) | 129 | 2.7 | 76 | ○ | 1.52 | 0.68 |
| Example 8 | 90 | Product B(10) | 126 | 2.5 | 75 | ○ | 2.03 | 1.18 |

Note:
○ means the background can be seen through the test pieces;
X means the background cannot be seen through the test pieces As can be seen from Table 2, addition of 5 parts by weight of toughener in Preparation Example 1-8 (that is Example 1-8) can improve fracture toughness (K1c) and fracture toughness (G1c) effectively. More specifically, the fracture toughness (K1c) of Example 1-8 was raised more than two times of that of epoxy resin without any toughener (Comparative Example 1), and the fracture toughness (G1c) was raised more than four times of that of epoxy resin without any toughener (Comparative Example 1). Furthermore, the fracture toughness (K1c) of Example 1-8 were all higher than that of epoxy resin with 15 parts by weight of CTBN (Comparative Example 2-3), and the fracture toughness (G1c) were all higher than that of epoxy resin with 10 parts by weight of CTBN (Comparative Example 2-2). Especially, since the toughener in Example 5 contained carboxyl functional group which can react with an epoxy resin, the effect of improving toughness was further increased. These results show that the epoxy resin compositions in Example 1-8 all exhibited superior toughness improvement.

Moreover, as shown in Table 2, the heat resistance (glass transition temperature (Tg)), elastic modulus (stiffness), and transparency of Example 1-8 were maintained and close to that of epoxy resin free of any toughener (Comparative Example 1), and the tensile strength was higher than that in the situation of using CTBN as a toughener (Comparative Example 2-3).

According to the results of above Comparative Examples and Examples, using the branched rubber copolymer provided by some embodiments of present disclosure as a toughener of an epoxy resin composition can express excellent performance and alleviating the problems of conventional liquid rubber type tougheners (such as CTBN) when increasing the toughness of an epoxy resin, such as large amount of additives, decreasing heat resistance, stiffness, tensile strength, and transparency.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An epoxy resin composition, comprising:
    80-100 parts by weight of a thermal curable epoxy resin; and
    0.1-20 parts by weight of a branched rubber copolymer, wherein the branched rubber copolymer comprises:
    a rubber polymer serving as a main portion;
    a polymer serving as a branched chain, wherein the branched chain is composed of polyethylene glycol (PEG), derivatives of polyethylene glycol, polycaprolactone (PCL), derivatives of polycaprolactone, or a combination thereof,
    wherein the rubber polymer is:
    a homopolymer or a copolymer of diene rubber, hydrogenated diene rubber, polyacrylate rubber, ethylene propylene rubber, butyl rubber, or fluororubber; or a combination of the homopolymer or the copolymer.

2. The epoxy resin composition as claimed in claim 1, wherein the thermal curable epoxy resin comprises:
    100 parts by weight of an epoxy resin;
    5-120 parts by weight of a curing agent;
    0-2 parts by weight of an accelerant.

3. The epoxy resin composition as claimed in claim 2, wherein the epoxy resin comprises:
    bisphenol A epoxy resin, phenolic epoxy resin, bisphenol F epoxy resin, bisphenol S epoxy resin, alicyclic epoxy resin, halogenated bisphenol A epoxy resin, hydrogenated bisphenol A epoxy resin, polyfunctional groups diglycidyl ether resin, heterocycle epoxy resin, or a combination thereof.

4. The epoxy resin composition as claimed in claim 2, wherein the curing agent comprises:
    methyltetrahydrophthalic anhydride (MTHPA), 4-methylhexahydrophthalic anhydride, succinic anhydride, dicyandiamide, m-phenylenediamine, triethylenetetramine, polyetheramine, diaminodiphenyl sulfone, polyethylenimine, or a combination thereof.

5. The epoxy resin composition as claimed in claim 2, wherein the accelerant comprises:
1-methyl-imidazole, 2,4,6-tri (dimethylamine methylene) phenol, 3-(3,4-dichlorophenyl)-1,1-dimethylurea, benzyltriethylammonium chloride, or a combination thereof.

6. The epoxy resin composition as claimed in claim 1, wherein the branched rubber copolymer has a viscosity of 1-500 Pa·s when the temperature is below 100° C.

7. The epoxy resin composition as claimed in claim 1, wherein the diene rubber has a structure as follows:

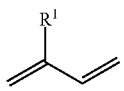

wherein the $R^1$ is H or $CH_3$.

8. The epoxy resin composition as claimed in claim 1, wherein a monomer of the polyacrylate rubber has a structure as follows:

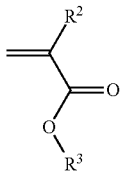

wherein the $R^2$ is H or $CH_3$; $R^3$ is a saturated or unsaturated $C_4$-$C_{35}$ carbon chain.

9. The epoxy resin composition as claimed in claim 1, wherein the branched rubber copolymer comprises:
0-15 mol % of a functional group capable of participating in a curing reaction of the thermal curable epoxy resin, wherein the functional group comprises carboxyl group, hydroxyl group, epoxy group, amino group, or a combination thereof.

10. The epoxy resin composition as claimed in claim 9, wherein the functional group capable of participating in a curing reaction of the thermal curable epoxy resin is on the rubber polymer serving as the main portion or on the polymer serving as the branched chain.

11. The epoxy resin composition as claimed in claim 1, wherein the branched rubber copolymer has a number average molecular weight of 1,000-60,000.

12. The epoxy resin composition as claimed in claim 1, wherein the polymer used as a branched chain has a number average molecular weight of 300-30,000.

13. The epoxy resin composition as claimed in claim 1, wherein the polymer serving as a branched chain is 15 wt %-65 wt %, based on the weight of the branched rubber copolymer.

14. The epoxy resin composition as claimed in claim 1, wherein the branched chain of the branched rubber copolymer is in a random arrangement.

* * * * *